US006366600B1

(12) United States Patent
Agrawal et al.

(10) Patent No.: US 6,366,600 B1
(45) Date of Patent: Apr. 2, 2002

(54) SPREADER ARCHITECTURE FOR DIRECT SEQUENCE SPREAD SPECTRUM COMMUNICATIONS

(75) Inventors: Avneesh Agrawal, Sunnyvale; David Hansquine; Paul E. Bender, both of San Diego, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/211,989

(22) Filed: Dec. 14, 1998

(51) Int. Cl.[7] .............................................. H04B 1/69
(52) U.S. Cl. ....................................................... 375/130
(58) Field of Search ................................. 375/130, 136, 375/147, 329, 135, 146

(56) References Cited

U.S. PATENT DOCUMENTS 5,842,118 A * 11/1998 Wood, Jr. ................... 455/101
5,872,810 A * 2/1999 Philips et al. ............... 375/222
6,088,402 A * 7/2000 White ......................... 375/326

* cited by examiner

*Primary Examiner*—Chi Pham
*Assistant Examiner*—Kevin M Burd
(74) *Attorney, Agent, or Firm*—Philip Wadsworth; Charles D. Brown; Bruce Greenhaus

(57) ABSTRACT

A spreader architecture for direct sequence spread spectrum communications is disclosed. This single architecture can perform OOK, BPSK, or QPSK spreading modulation of a carrier. In the QPSK and BPSK modes, input data is spread by pseudonoise signals to produce digital representations of phase-modulated baseband in-phase and quadrature components. In the OOK mode, the spectrum of the baseband components is selectively spread according to the input data. In an exemplary application, the various modulation modes are used to encode the control and traffic channels of a code-division multiple-access cellular telephone system.

20 Claims, 11 Drawing Sheets

SPREADER ARCHITECTURE FOR DIRECT SEQUENCE SPREAD SPECTRUM COMMUNICATIONS

BACKGROUND OF THE INVENTION

1. Field of the Invention

The present invention relates to direct sequence spread spectrum communications (DSSS) systems. More specifically, the present invention relates to a single spreader architecture for a DSSS system that can spread the spectrum of a baseband data signal by either on-off keying (OOK), binary phase-shift keying (BPSK), or quadrature phase-shift-keying (QPSK) modulation, depending on the levels of the spreader control lines. More specifically, the present invention relates to a single spreader architecture as described above for use in a code-division multiple-access (CDMA) communication system.

2. Related Art and General Background

Spread spectrum communication techniques offer robustness to noise, low transmission power, and a low probability of intercept. For such reasons, much of the early development of spread spectrum technology was performed by military researchers. Recently, however, the advantages of this technology have led to its increasing use for consumer applications as well: most notably, in advanced digital cellular telephone systems.

Whereas most other communication techniques modulate a carrier signal with one or more data signals alone, spread spectrum techniques also modulate the carrier with a pseudorandom noise or 'pseudonoise' (PN) signal. In the frequency-hopping variant of spread spectrum systems, the value of the PN signal at a particular instant determines the frequency of the transmitted signal, and thus the spectrum of the signal is spread. In the direct sequence spread spectrum (DSSS) variant, the bit rate of the PN signal (called the 'chip rate') is chosen to be higher than the bit rate of the information signal, such that when the carrier is modulated by both signals, its spectrum is spread.

Communication systems that support multiple individual signals over a single channel must employ some technique to make the various signals distinguishable at the receiver. In time-division multiple-access (TDMA) systems, the individual signals are time-compressed and transmitted in non-overlapping intervals such that they are orthogonal (and thus separable) in time space. In frequency-division multiple-access (FDMA) systems, the signals are bandlimited and transmitted in nonoverlapping subchannels such that they are orthogonal in frequency space. In code-division multiple-access (CDMA) systems, the signals are spread through modulation by orthogonal code sequences such that they are orthogonal in code space and may be transmitted across the same channel at the same time while remaining distinguishable from each other at the receiver.

In a CDMA DSSS system, then, each individual signal is modulated by a data signal and a pseudonoise (PN) signal that is at least nearly orthogonal to the PN signals assigned to all other users, thus spreading the spectrum of the signal while rendering it distinguishable from the other users' signals. Before spreading and modulation onto the carrier, the data signal typically undergoes various encoding and interleaving operations designed, for example, to increase data redundancy and allow error correction at the receiver. The data signals may also be encrypted to provide extra security against eavesdroppers. The generation of CDMA signals in a spread spectrum communications system is disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM," assigned to the assignee of the present invention, and the disclosure of which is hereby incorporated by reference.

A demand for higher data rates and a greater variety of service options has recently caused the complexity of CDMA cellular telephone systems to increase. In order to accommodate the various forms of control and data signals required to provide such services, a single system must support multiple forms of spreading modulation from one instant to the next. High-density voice and data transmissions benefit from the use of QPSK spreading, while lower-density traffic can be handled more efficiently using BPSK spreading, and OOK spreading is best suited for certain signalling and control transmissions.

Traditionally, each particular method of spreading to be supported would require a complete and separate spreader circuit. However, this system requirement conflicts with consumer demands for smaller handsets and longer periods of operation between battery recharges, which require reductions in circuit complexity and the number of components used. Also, in order to reduce circuit size and fabrication cost, the spreader should be constructed as much as possible using digital rather than analog (linear) components.

SUMMARY OF THE INVENTION

One object of the present invention is to reduce circuit complexity, gate count, and power consumption by using a single spreader architecture that is capable of spreading the spectrum of a baseband data signal by OOK, BPSK, or QPSK modulation, depending on the levels of the spreader control lines.

DETAILED DESCRIPTION OF THE PREFERRED EMBODIMENTS

I. First Embodiment

Figure 1:
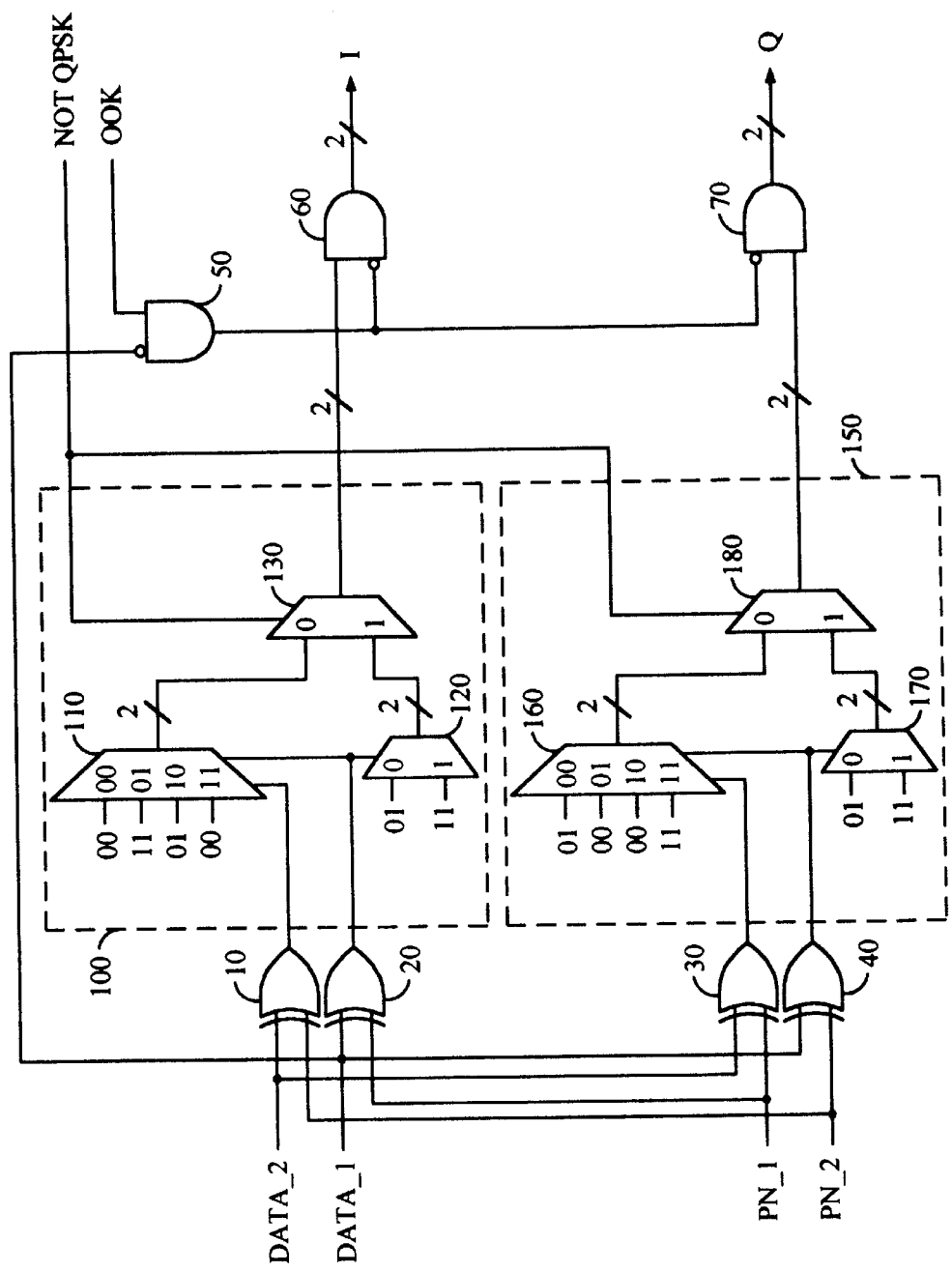
FIG. 1 is a schematic diagram of the first embodiment of the spreader architecture disclosed herein.

FIG. 1 is a schematic diagram of the first embodiment of a spreader architecture according to the present invention. This embodiment receives two binary data input streams data_1 and data_2 and two control signals OOK and 'not QPSK,' each one bit wide. Those of ordinary skill in the art will recognize throughout the descriptions of the various embodiments that, for example, input streams data_1 and data_2 may be combined into a single two-bit-wide binary signal, or may be taken from a single binary data stream; control signals OOK and 'not QPSK' may be combined into a single two-bit-wide binary or a ternary-valued signal; and a single PN signal may be used to encode both baseband signal components, instead of two separate PN signals as illustrated.

The first data stream data_1 is presented to inputs of XOR gates 20 and 40 and to an inverting input of AND gate 50, and the second data stream data_2 is presented to inputs of XOR gates 10 and 30. The PN sequence PN_1 is presented to inputs of XOR gates 20 and 30, and the PN sequence PN_2 is presented to inputs of XOR gates 10 and 40. These PN sequences are selected to have minimal cross-correlation, and their properties and generation are discussed in more detail in, e.g., *Modern Communication Systems: Principles and Applications*, Leon W. Couch III, Prentice Hall, 1995, pp. 381–83, and chapter 2 of *CDMA: Principles of Spread Spectrum Communication*, Andrew J. Viterbi, Addison-Wesley, 1995.

Figure 1A:
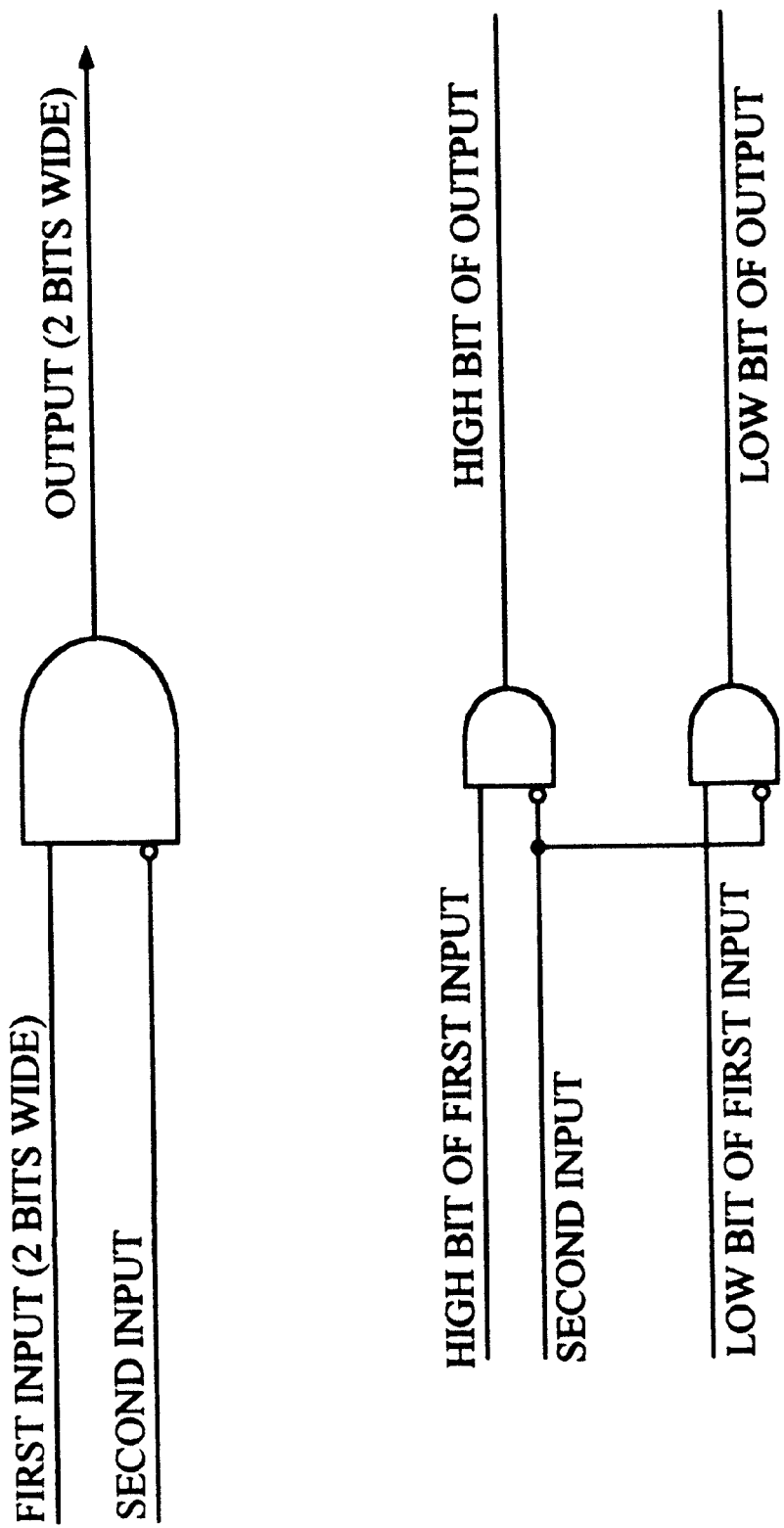
FIG. 1A is a diagram relating a symbol used for an AND gate having a one-bit-wide input, a two-bit-wide input, and a two-bit-wide output to an equivalent expression in one-bit-wide terms.

Control signal OOK is presented to a non-inverting input of AND gate 50, and control signal 'not QPSK' is presented to the select inputs of 2-to-1 multiplexers 130 and 180. The output of the spreader appears at the outputs of gates 60 and 70 as digitally encoded representations of the I and Q components, respectively, of a baseband signal. For clarity, FIG. 1A shows the symbol used, e.g., in FIG. 1 for gates 60 and 70 and one of its equivalents in one-bit-wide terms. The 1-bit digital values 0 and 1 that may appear on the signals data_1, data_2, PN_1, and PN_2 as time progresses represent the analog values 1 and −1, respectively, as indicated in TABLE 1A. The scheme by which each analog value in the output baseband signal components is represented by a 2-bit digital number in the spreader output is given in TABLE 1B.

TABLE 1A

| Digital representation | Analog value |
| --- | --- |
| 0 | 1 |
| 1 | −1 |

TABLE 1B

| Digital representation | Analog value |
| --- | --- |
| 00 | 0 |
| 01 | 1 |
| 10 | Not used |
| 11 | −1 |

Those of ordinary skill in the art will recognize throughout this disclosure that each or any combination of the various multiplexers may be substituted by, e.g., any combinational logic circuit (as produced, for example, by a VHDL or Verilog compiler or VLSI design tool) that performs the specified logical function or its equivalent using a possibly different arrangement of logical elements or gates, and that such substitution falls within the scope of the disclosed invention and may be done without requiring use of the inventive faculty.

1. Operation in QPSK Mode

Of the three spreading modulation schemes, QPSK offers the highest capacity for data throughput in a given bandwidth. Commonly, when QPSK spreading is used, the data streams data_1 and data_2 comprise the even and odd symbol cosets, for example, of a single data stream.

Figure 7:
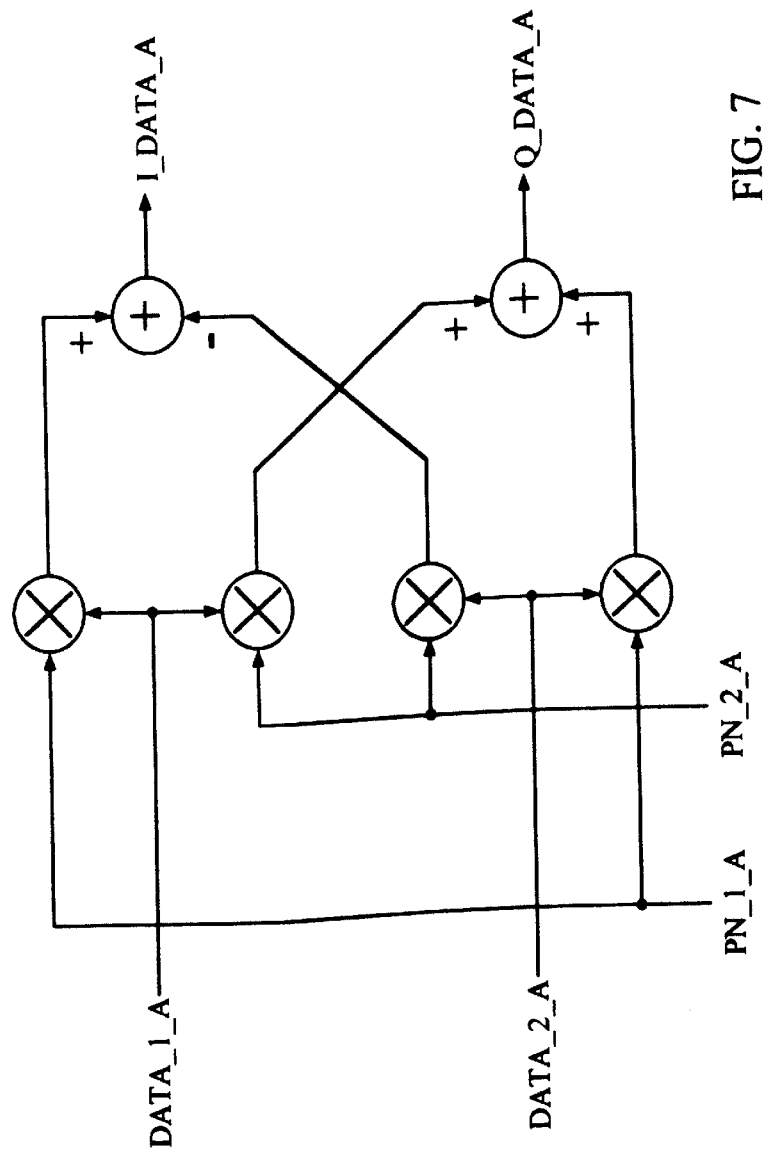
FIG. 7 is a diagram of a QPSK spreader.

In the current embodiment, the complex relation between the analog values represented by the data streams and the pseudonoise signals at the input, and the QPSK-spread signal at the output, may be expressed as $$I\_out\_A + (j \times Q\_out\_A) = \tfrac{1}{2} \times [data\_1\_A + (j \times data\_2\_A)] \times [PN\_1\_A + (j \times PN\_2\_A)],$$

where I_out_A and Q_out_A are the analog signals represented by the spreader outputs I and Q, data_1_A and data_2_A are the analog signals represented by the data streams data_1 and data_2, PN_1_A and PN_2_A are the analog signals represented by the pseudonoise signals PN_1 and PN_2, and j is the square root of −1. FIG. 7 illustrates a circuit with which QPSK spreading as expressed above may be implemented.

When QPSK spreading is to be performed using the first embodiment (as shown in FIG. 1), the outputs of XOR gates 10 and 20 (representing the values of the logical expressions 'data_2 XOR PN_2' and 'data_1 XOR PN_1,' respectively) are used to select among the four hard-coded data inputs to multiplexer 110. Similarly, the outputs of XOR gates 30 and 40 (representing the values of the logical expressions 'data_2 XOR PN_1' and 'data_1 XOR PN_2,' respectively) are used to select among the four hard-coded data inputs to multiplexer 160. The resulting 2-bit-wide digital outputs of these multiplexers and the analog values they represent are as indicated in TABLE 2 and TABLE 3.

TABLE 2

| Output of gate 10 | Output of gate 20 | Output of multiplexer 110 |
| --- | --- | --- |
| 0 | 0 | 00 = '0' |
| 0 | 1 | 11 = '−1' |
| 1 | 0 | 01 = '1' |
| 1 | 1 | 00 = '0' |

TABLE 3

| Output of gate 30 | Output of gate 40 | Output of multiplexer 169 |
| --- | --- | --- |
| 0 | 0 | 01 = '1' |
| 0 | 1 | 00 = '0' |
| 1 | 0 | 00 = '0' |
| 1 | 1 | 11 = '−1' |

Figure 2:
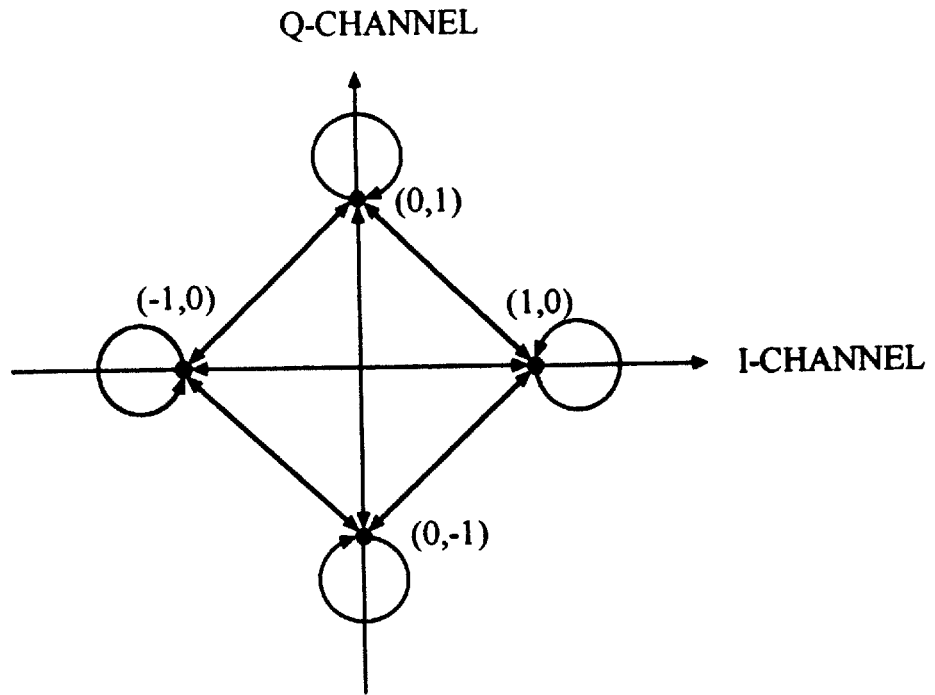
FIG. 2 is the phase constellation represented by the output of the first embodiment when QPSK spreading is selected.

As QPSK spreading is selected, the control signal 'not QPSK' is held low, causing the outputs of 4-to-1 miltiplexers 110 and 160 to pass unaltered through the 2-to-1 multiplexers 130 and 180, respectively. For QPSK spreading, control signal OOK is also held low, so that these digital outputs pass unaltered through AND gates 60 and 70 to become the output of the spreader, i.e. the encoded representations of the baseband I and Q components, respectively. The phase constellation represented by these digital signals is displayed in FIG. 2, and the possible range of inputs is displayed in TABLE 4 along with the 2-bit digital representations and encoded analog values of the corresponding output values.

TABLE 4

| data_1 | data_2 | PN_1 | PN_2 | Spreader output I | Spreader output Q |
|---|---|---|---|---|---|
| 0 | 0 | 0 | 0 | 00 = '0' | 01 = '1' |
| 0 | 0 | 0 | 1 | 01 = '1' | 00 = '0' |
| 0 | 0 | 1 | 0 | 11 = '−1' | 00 = '0' |
| 0 | 0 | 1 | 1 | 00 = '0' | 11 = '−1' |
| 0 | 1 | 0 | 0 | 01 = '1' | 00 = '0' |
| 0 | 1 | 0 | 1 | 00 = '0' | 11 = '−1' |
| 0 | 1 | 1 | 0 | 00 = '0' | 01 = '1' |
| 0 | 1 | 1 | 1 | 11 = '−1' | 00 = '0' |
| 1 | 0 | 0 | 0 | 11 = '−1' | 00 = '0' |
| 1 | 0 | 0 | 1 | 00 = '0' | 01 = '1' |
| 1 | 0 | 1 | 0 | 00 = '0' | 11 = '−1' |
| 1 | 0 | 1 | 1 | 01 = '1' | 00 = '0' |
| 1 | 1 | 0 | 0 | 00 = '0' | 11 = '−1' |
| 1 | 1 | 0 | 1 | 11 = '−1' | 00 = '0' |
| 1 | 1 | 1 | 0 | 01 = '1' | 00 = '0' |
| 1 | 1 | 1 | 1 | 00 = '0' | 01 = '1' |

2. Operation in BPSK Mode

Figure 6:
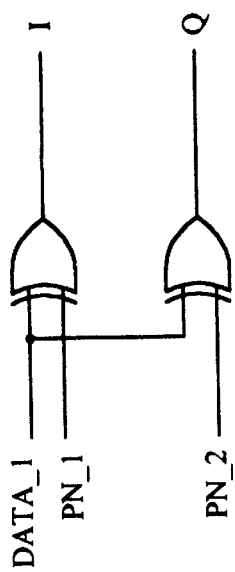
FIG. 6 is a diagram of a digital BPSK spreader.

BPSK spreading modulation may be selected for lower-density data transmission. In this mode, the data stream data_2 is ignored, and spreading is performed only on the data stream data_1. The complex relation between the analog values represented by the data stream data_1 and the pseudonoise signals at the input, and the BSPK-spread signal at the output, may be expressed as $$I\_A+(j\times Q\_out\_A)=data\_1\_{A\times[PN\_1A+(j\times PN\_2\_A)]},$$

where $I\_out_{13}$ A and $Q\_out\_A$ are the analog signals represented by the spreader outputs I and Q, data_1_A is the analog signal represented by the data stream data_1, PN_2_A are the analog signals represented by the pseudonoise signals PN_1 and PN_2, and j is the square root of −1. FIG. 6 illustrates a digital circuit with which BPSK spreading may be implemented.

Figure 3:
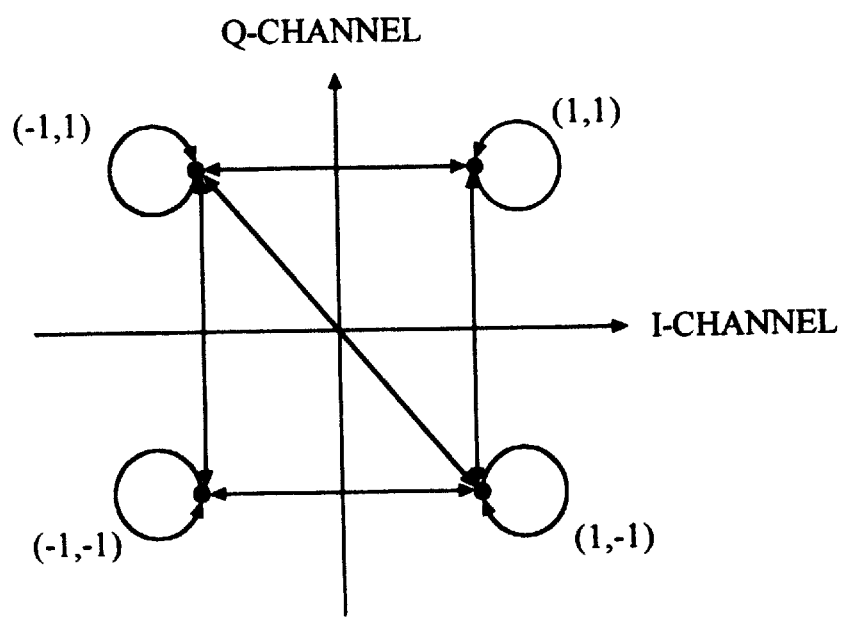
FIG. 3 is the phase constellation represented by the output of the first embodiment when BPSK spreading is selected.

When BPSK spreading modulation is to be performed using the first embodiment (FIG. 1), the control signal 'not QPSK' is asserted, causing the 2-to-1 multiplexers 130 and 180 to pass the outputs of 2-to-1 multiplexers 120 and 170, respectively. The output of multiplexer 120 is selected by the output of XOR gate 20 only, and the output of multiplexer 170 is selected by the output of XOR gate 40 only. The analog values for each baseband component and their 2-bit digital representations are indicated in TABLE 5 for all possible values of data_1, PN_1, and PN_2, and the phase constellation represented by these digital signals is displayed in FIG. 3.

TABLE 5

| data_1 | PN_1 | PN_2 | Spreader output I | Spreader output Q |
|---|---|---|---|---|
| 0 | 0 | 0 | 01 = '1' | 01 = '1' |
| 0 | 0 | 1 | 01 = '1' | 11 = '−1' |
| 0 | 1 | 0 | 11 = '−1' | 01 = '1' |
| 0 | 1 | 1 | 11 = '−1' | 11 = '−1' |
| 1 | 0 | 0 | 11 = '−1' | 11 = '−1' |
| 1 | 0 | 1 | 11 = '−1' | 01 = '1' |
| 1 | 1 | 0 | 01 = '1' | 11 = '−1' |
| 1 | 1 | 1 | 01 = '1' | 01 = '1' |

3. Operation in OOK Mode

OOK spreading modulation may be selected for certain signalling and noncritical special service transmissions. As with BPSK operation, the control signal 'not QPSK' is asserted, the second data stream data_2 is ignored, and spreading is performed only on the first data stream data_1.

When OOK spreading is to be performed and the signal data_1 is low, the outputs of AND gates 60 and 70 are held low and a value of zero is encoded onto both spreader output components. When data_1 is high, the pseudonoise signal PN_1 is inverted by XOR gate 20 and is then used to select among the two hard-coded data inputs to 2-to-1 multiplexer 120, and the pseudonoise signal PN_2 is inverted by XOR gate 40 and is then used to select among the two hard-coded data inputs to 2-to-1 multiplexer 170. The outputs of these multiplexers pass through the rest of the circuit unaltered, such that the relation between the PN signals, and the 2-bit-wide digital outputs and the analog values they represent, are as indicated in TABLE 6.

TABLE 6

| PN_1 | PN_2 | Spreader output I | Spreader output Q |
|---|---|---|---|
| 0 | 0 | 11 = '−1' | 11 = '−1' |
| 0 | 1 | 11 = '−1' | 01 = '1' |
| 1 | 0 | 01 = '1' | 11 = '−1' |
| 1 | 1 | 01 = '1' | 01 = '1' |

Those skilled in the art will recognize that in this and later embodiments, an equivalent function may be obtained by substituting different arrangements of logical gates for, e.g., gates 50, 60, and/or 70 without use of the inventive faculty. Therefore, the present invention is not intended to be limited to the arrangements illustrated but rather is to be accorded the widest scope consistent with the principles and novel features disclosed in any fashion herein.

II. Second and Third Embodiments

Figure 4A:
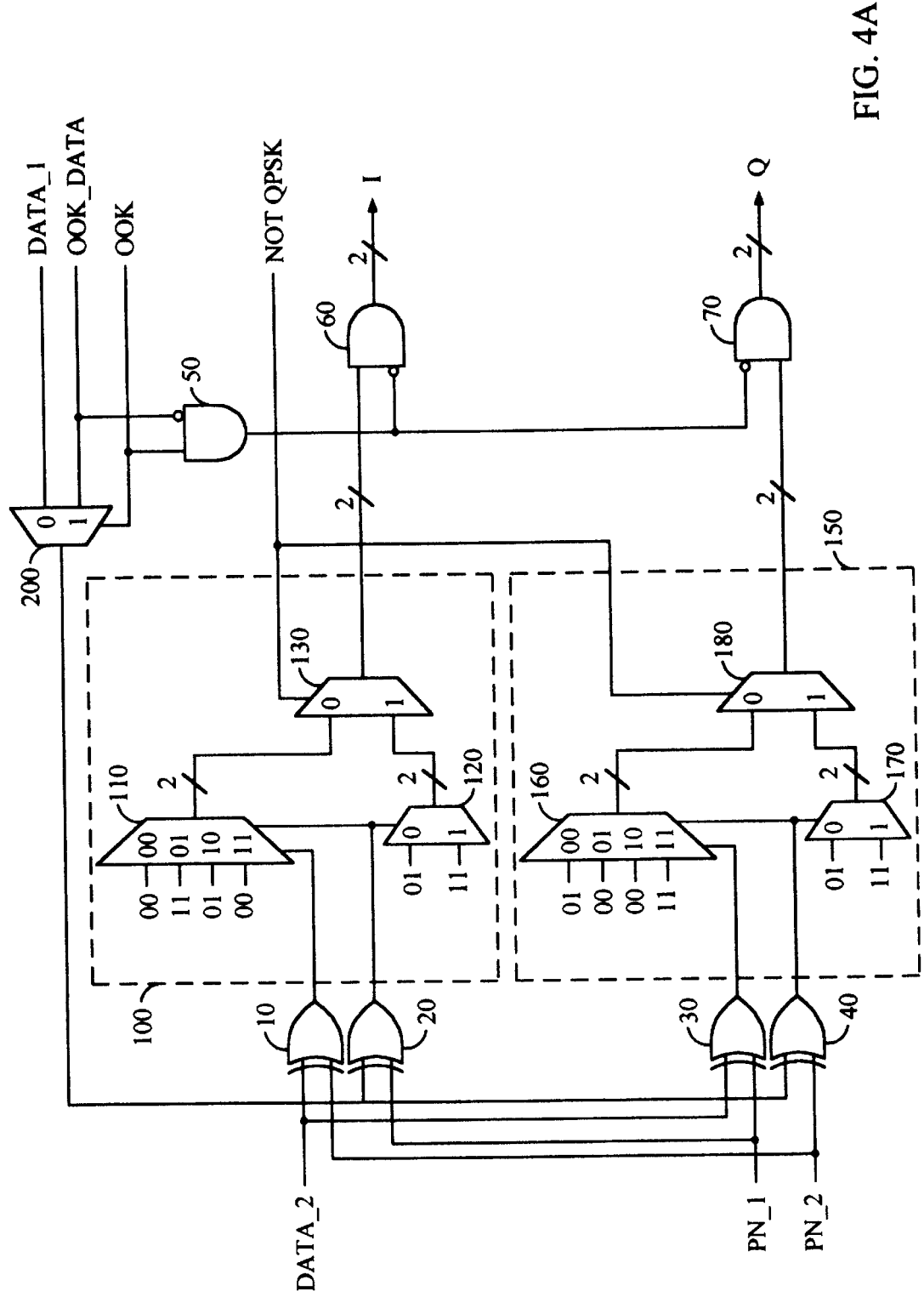
FIG. 4A is a schematic diagram of the second embodiment of the spreader architecture disclosed herein.

In the second embodiment, as illustrated in FIG. 4A, a separate input OOK_data is provided for data to be spread by OOK. This modification allows such data to be generated and/or presented to the spreader at a different symbol rate than the data_1 stream.

For OOK spreading, the control signal 'not QPSK' is asserted, so that the multiplexers 130 and 180 pass the outputs of multiplexers 120 and 170, respectively. The control signal OOK is also asserted, so that 2-to-1 multiplexer 200 passes the signal OOK_data. XOR gates 20 and 40 output the values of the logical expressions 'OOK_data XOR PN_1' and 'OOK_data XOR PN_2,' respectively, and these values select the outputs of multiplexers 120 and 170, respectively.

When OOK spreading is to be performed and the signal OOK_data is low, the outputs of AND gates 60 and 70 are held low and a value of zero is encoded onto both spreader output components. When OOK spreading is to be performed and the signal OOK_data is high, the digital values appearing on the spreader outputs, and the analog values they represent, are as in TABLE 7A, depending on the values of the pseudonoise signals PN_1 and PN_2.

TABLE 7A

| PN_1 | PN_2 | Spreader output I | Spreader output Q |
|---|---|---|---|
| 0 | 0 | 11 = '−1' | 11 = '−1' |
| 0 | 1 | 11 = '−1' | 01 = '1' |

TABLE 7A-continued

| PN_1 | PN_2 | Spreader output I | Spreader output Q |
|------|------|-------------------|-------------------|
| 1    | 0    | 01 = '1'          | 11 = '−1'         |
| 1    | 1    | 01 = '1'          | 01 = '1'          |

Figure 4B:
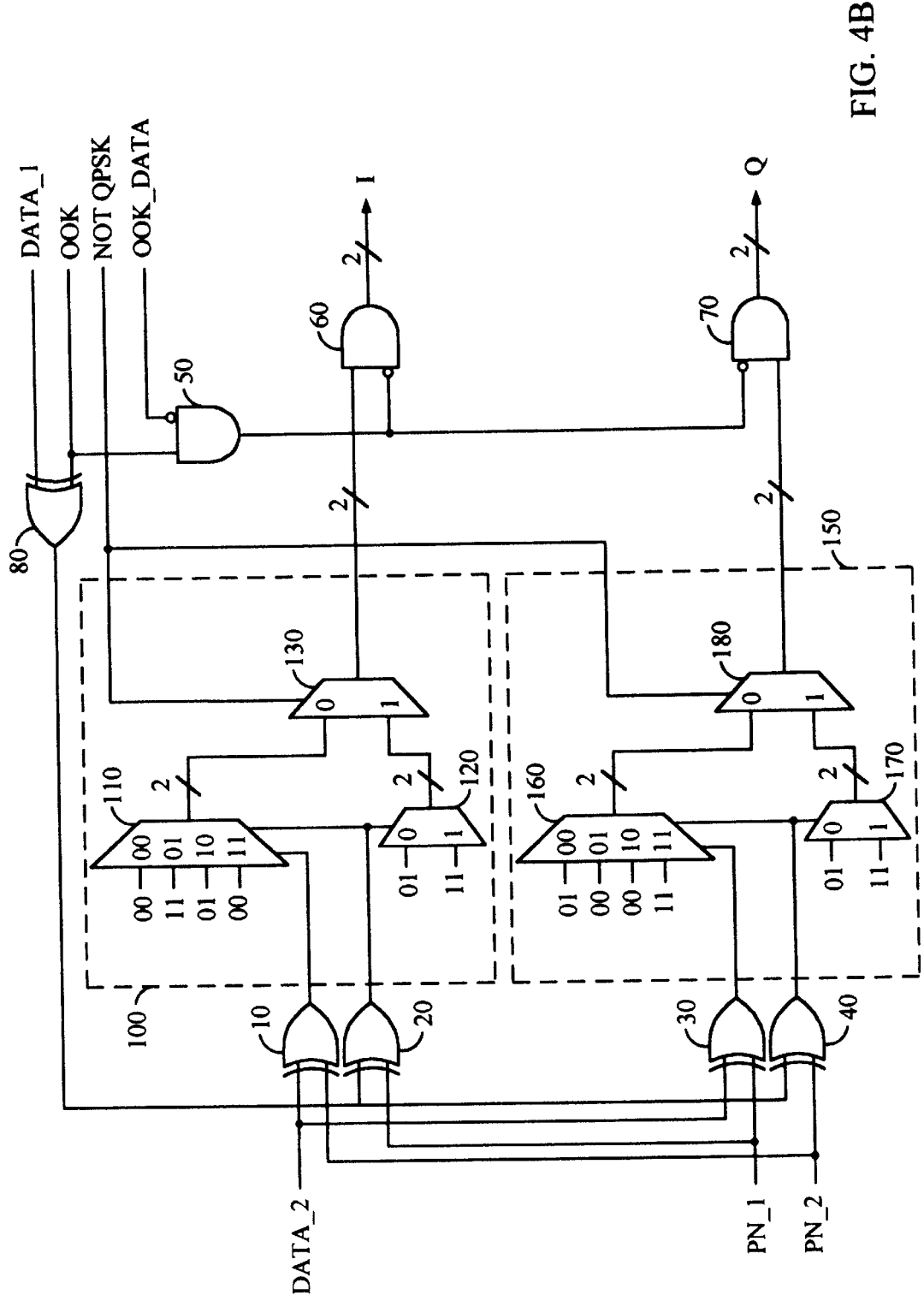
FIG. 4B is a schematic diagram of the third embodiment of the spreader architecture disclosed herein.

In the third embodiment, as illustrated in FIG. 4B, an XOR gate 80 is used in place of the multiplexer 200. This arrangement also allows the output signal to contain at least a portion of both input data streams at the same time, and may therefore be used for transmitting two different information streams at once.

For OOK spreading, the control signal 'OOK' is asserted, so that XOR gate 80 inverts the data signal data_1 before passing it to inputs of XOR gates 20 and 40. When OOK spreading is to be performed and the signal OOK_data is low, the outputs of AND gates 60 and 70 are held low and a value of zero is encoded onto both spreader output components. When OOK spreading is to be performed and the signal OOK_data is high, the digital values appearing on the spreader outputs, and the analog values they represent, are as in TABLE 7B, depending on the values of the data stream data_1 and the pseudonoise signals PN_1 and PN_2.

TABLE 7B

| data_1 | PN_1 | PN_2 | Spreader output I | Spreader output Q |
|--------|------|------|-------------------|-------------------|
| 0      | 0    | 0    | 11 = '−1'         | 11 = '−1'         |
| 0      | 0    | 1    | 11 = '−1'         | 01 = '1'          |
| 0      | 1    | 0    | 01 = '1'          | 11 = '−1'         |
| 0      | 1    | 1    | 01 = '1'          | 01 = '1'          |
| 1      | 0    | 0    | 01 = '1'          | 01 = '1'          |
| 1      | 0    | 1    | 01 = '1'          | 11 = '−1'         |
| 1      | 1    | 0    | 11 = '−1'         | 01 = '1'          |
| 1      | 1    | 1    | 11 = '−1'         | 11 = '−1'         |

Those skilled in the art will recognize that the invention may also be practiced by, e.g., deleting XOR gate 80 and passing the data stream data_1 directly to inputs of XOR gates 20 and 40.

III. Fourth and Fifth Embodiments

Figure 4C:
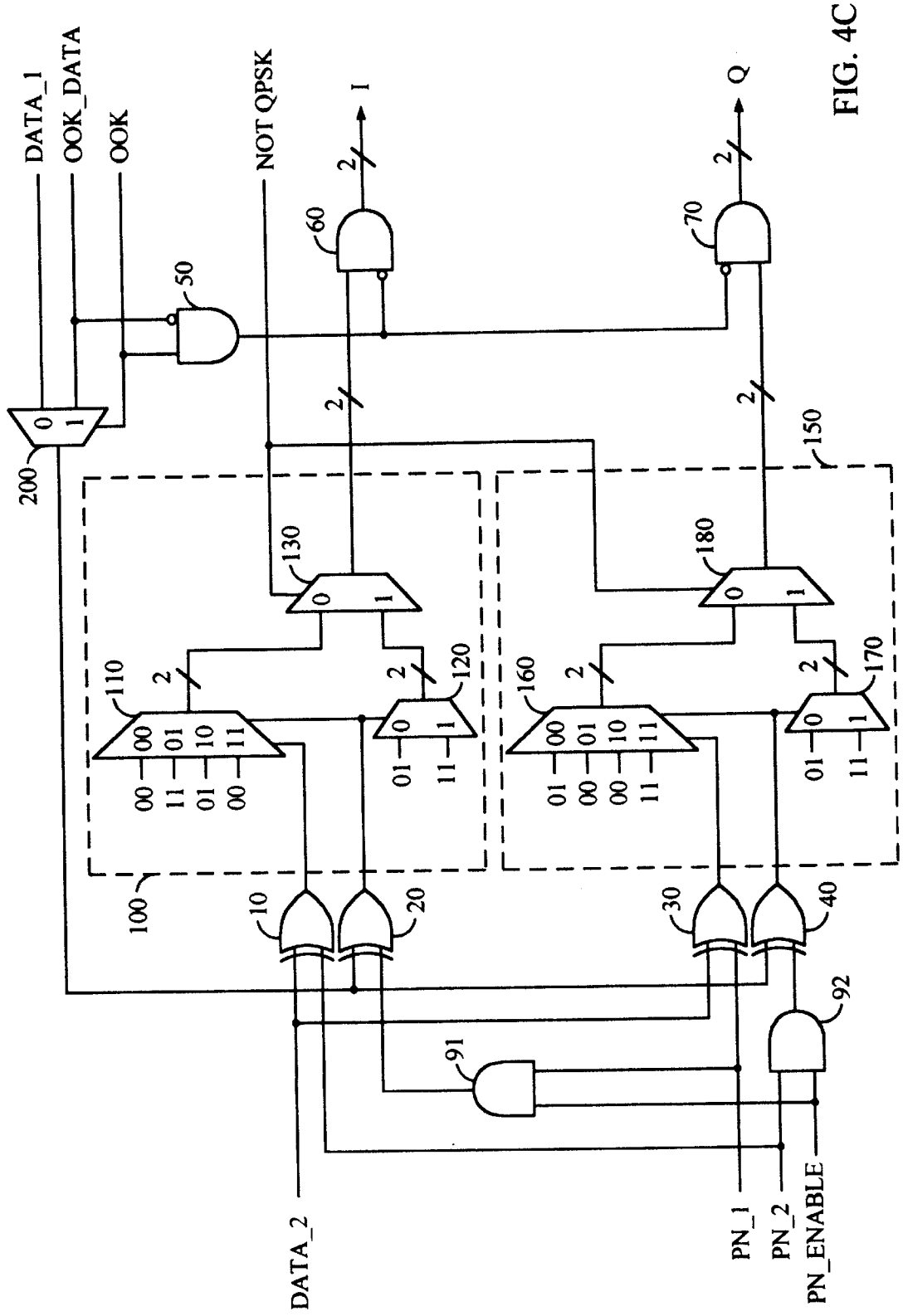
FIG. 4C is a schematic diagram of the fourth embodiment of the spreader architecture disclosed herein.
Figure 4D:
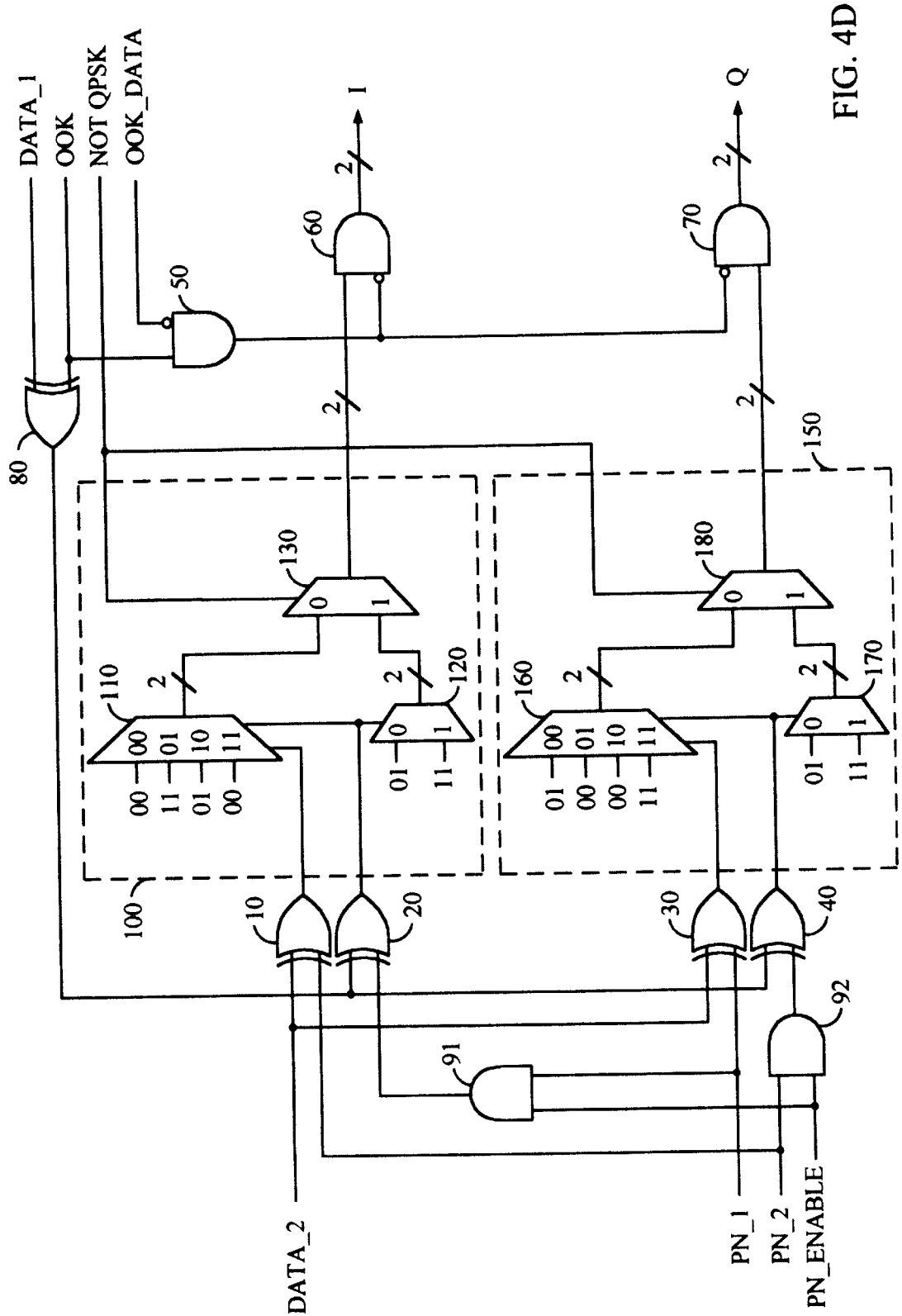
FIG. 4D is a schematic diagram of the fifth embodiment of the spreader architecture disclosed herein.

In some situations, it may be unnecessary or even undesirable to spread the signal by the pseudonoise sequences. For example, in a case where OOK modulation is selected, it may be sufficient to output a data signal for modulation onto the carrier without spreading. FIGS. 4C and 4D illustrate the fourth and fifth embodiments, wherein circuitry to support a control signal PN_enable is added to the second and third embodiments. When the control signal PN_enable is asserted, the operation of these embodiments is not changed. When the control signal PN_enable is deasserted, however, the data signal outputted by multiplexer 200 and XOR gate 80, respectively, passes through XOR gates 20 and 40 without changing state.

Those skilled in the art will recognize that, for example, a two-bit AND gate similar to the one illustrated in FIG. 1A may be substituted for AND gates 91 and 92. Also, by providing appropriate inversion or an equivalent rearrangement of logical elements, the control signal OOK may serve as the control signal PN_enable for cases in which PN spreading is to be disabled when OOK modulation is selected.

Those skilled in the art will also recognize that means similar to gates 91 and 92 may be used to control passage of the signals PN_1 and PN_2 to the inputs of gates 30 and 10, respectively, if, for example, disabling of PN spreading is desired when another modulation mode is selected.

IV. Sixth and Seventh Embodiments

Figure 5A:
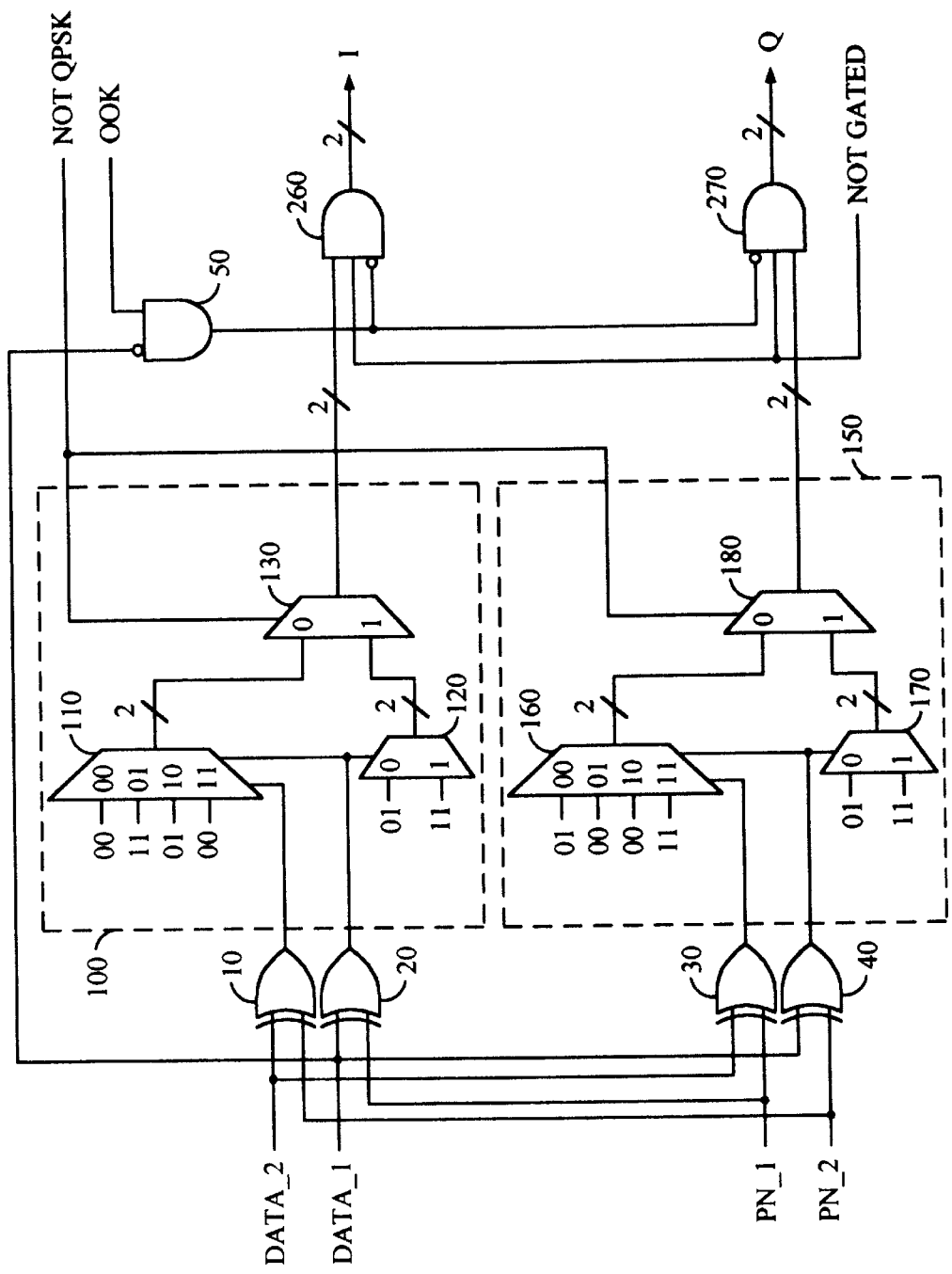
FIG. 5A is a schematic diagram of the sixth embodiment of the spreader architecture disclosed herein.
Figure 5B:
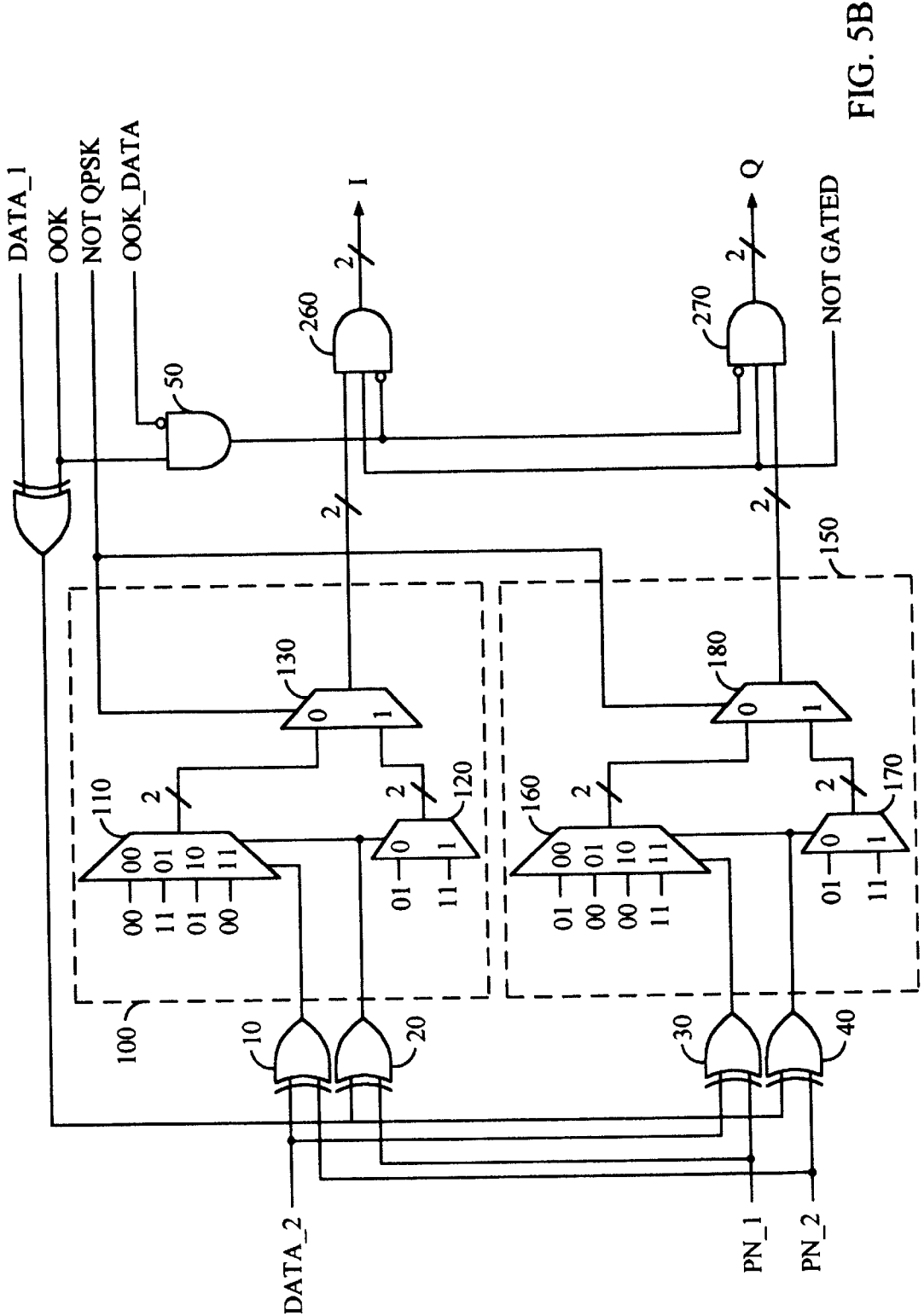
FIG. 5B is a schematic diagram of the seventh embodiment of the spreader architecture disclosed herein.

In the sixth and seventh embodiments (shown in FIGS. 5A and 5B), support for gating the output waveforms is added to the first and third embodiments. Such function may be desired, for example, to delineate data frames or to provide system timing information. FIGS. 5A and 5B illustrate how this function may be incorporated into the spreader as depicted in FIGS. 1 and 4B, respectively, by including an additional input to AND gates 60 and 70 (thereby obtaining AND gates 260 and 270) for processing a gating control signal 'not gated.' When this signal is deasserted, the outputs of AND gates 260 and 270 are held low and a value of zero is encoded onto both spreader output components.

Those skilled in the art will recognize that the gating control signal may be changed from an active-low to an active-high signal by, for example, providing inversion at or before the input of this signal to gates 260 and 270. Those skilled in the art will also recognize that such gating or its equivalent may be applied to any of the embodiments described herein or their equivalents, without limitation to the circuits illustrated in FIGS. 5A and 5B.

Figure 8:
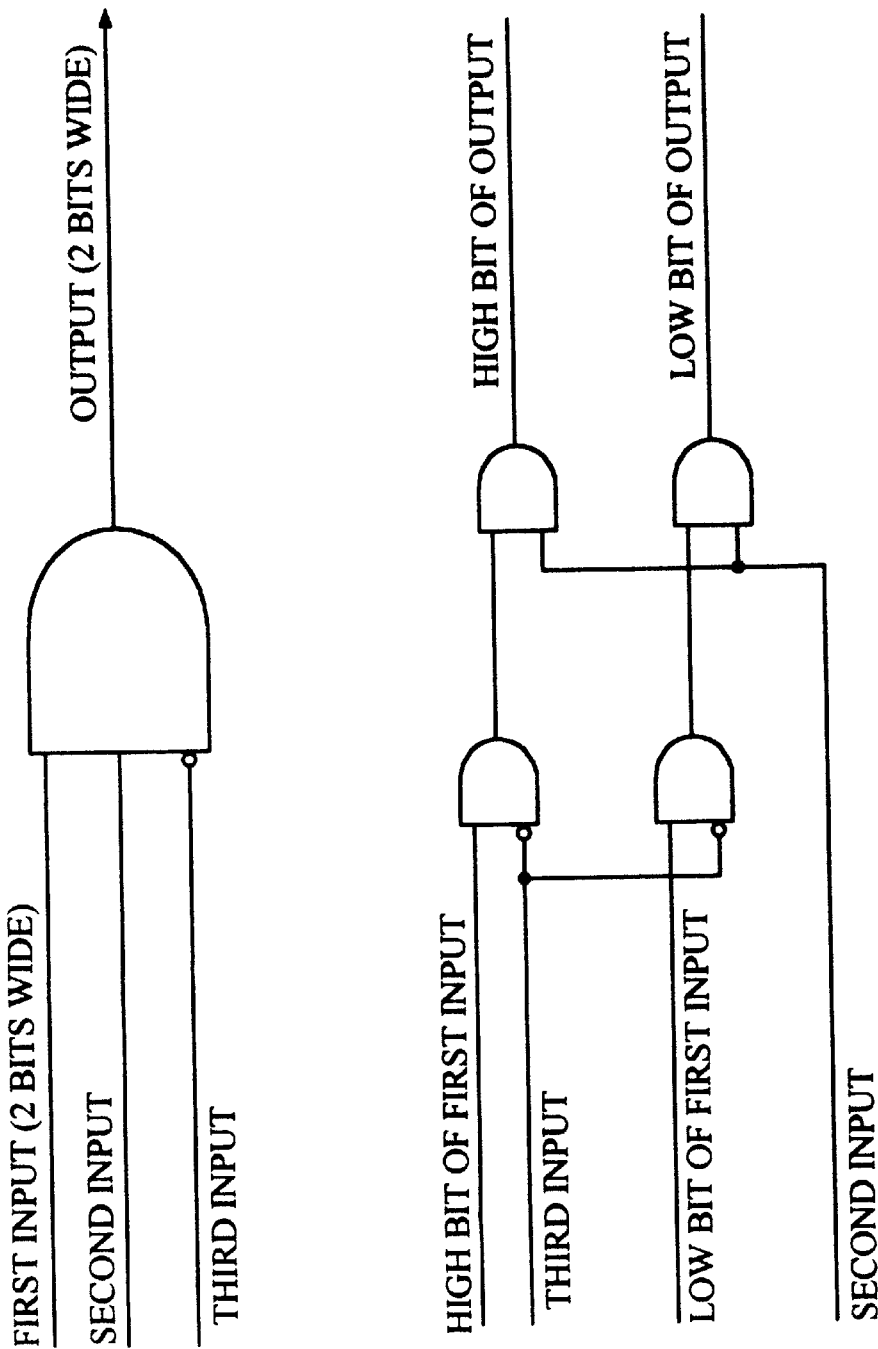
FIG. 8 is a diagram relating a symbol used for an AND gate having two one-bit-wide inputs, a two-bit-wide input, and a two-bit-wide output to an equivalent expression in one-bit-wide terms.

For clarity, FIG. 8 shows the symbol used in FIGS. 5A and 5B for gates 260 and 270 and one of its equivalents in one-bit-wide terms.

The foregoing description of the preferred embodiments is provided to enable any person skilled in the art to make or use the present invention. Various modifications to these embodiments will be readily apparent to those skilled in the art, and the generic principles presented herein may be applied to other embodiments without use of the inventive faculty. Thus, the present invention is not intended to be limited to the embodiments shown above but rather is to be accorded the widest scope consistent with the principles and novel features disclosed in any fashion herein.

What is claimed is:

1. A spreader architecture, comprising:

a first binary arithmetic unit receiving a first input data signal and a first pseudonoise signal and outputting a first intermediate data signal according to a first predetermined binary arithmetic function applied to the first input data signal and the first pseudonoise signal, a second binary arithmetic unit receiving a second input data signal and a second pseudonoise signal and outputting a second intermediate data signal according to a second predetermined binary arithmetic function applied to the second input data signal and the second pseudonoise signal, a third binary arithmetic unit receiving the second input data signal and the first pseudonoise signal and outputting a third intermediate data signal according to a third predetermined binary arithmetic function applied to the second input data signal and the first pseudonoise signal, a fourth binary arithmetic unit receiving the first input data signal and the second pseudonoise signal and outputting a fourth intermediate data signal according to a fourth predetermined binary arithmetic function applied to the first input data signal and the second pseudonoise signal, a first selector receiving the first and second intermediate data streams and a QPSK select signal and outputting a first output data signal, a second selector receiving the third and fourth intermediate data streams and one among the QPSK select signal and its inversion and outputting a second output data signal, and an output selector receiving the first and second output data signals, an OOK data signal, and an OOK select signal and outputting first and second exiting data signals, wherein the first and second output data signals comprise at least the first input data signal spread by the first and second pseudonoise signals by one among at least BPSK and QPSK modulation, depending on the level of the QPSK select signal, and wherein the first and second exiting data signals comprise (A) one among at least the first input data signal and the OOK data signal (B) spread by the first and second pseudonoise signals by one among at least BPSK, QPSK, and OOK modulation, depending on the levels of the QPSK and OOK select signals.

2. A spreader architecture according to claim 1, said output selector comprising:

an OOK modulator receiving (A) one among the OOK data signal and its inversion and (B) one among the OOK select signal and its inversion and outputting an OOK modulation signal, a first output gate receiving (A) one among the first output data signal and its inversion and (B) one among the OOK modulation signal and its inversion and outputting a first exiting data signal; and a second output gate receiving (A) one among the second output data signal and its inversion and (B) and one among the OOK modulation signal and its inversion and outputting a second exiting data signal, wherein the first exiting data signal comprises the first output data signal OOK modulated by one among the OOK modulation signal and its inversion, and wherein the second exiting data signal comprises the second output data signal OOK modulated by one among the OOK modulation signal and its inversion.

3. A spreader architecture as in claim 1, said output selector receiving a gating signal, wherein the levels of the first and second exiting data signals remain constant when the gating signal assumes a predetermined level.

4. A spreader architecture as in claim 2, said first and second output gates receiving a gating signal, wherein the levels of the first and second exiting data signals remain constant when the gating signal assumes a predetermined level.

5. A spreader architecture as in claim 1, wherein at least one among the first through fourth predetermined binary arithmetic functions comprises a logical exclusive-OR function.

6. A spreader architecture as in claim 2, wherein at least one among the first through fourth predetermined binary arithmetic functions comprises a logical exclusive-OR function.

7. A spreader architecture as in claim 3, wherein at least one among the first through fourth predetermined binary arithmetic functions comprises a logical exclusive-OR function.

8. A spreader architecture as in claim 4, wherein at least one among the first through fourth predetermined binary arithmetic functions comprises a logical exclusive-OR function.

9. A spreader architecture as in claim 2, said OOK modulator comprising an AND gate.

10. A spreader architecture as in claim 4, said OOK modulator comprising an AND gate.

11. A spreader architecture as in claim 6, said OOK modulator comprising an AND gate.

12. A spreader architecture as in claim 8, said OOK modulator comprising an AND gate.

13. A spreader architecture as in claim 1, the OOK data signal comprising the first input data signal or its inversion.

14. A spreader architecture, comprising:

a first selector receiving a first initial data signal and an OOK select signal and outputting a first input data signal, a first binary arithmetic unit receiving the first input data signal and a first pseudonoise signal and outputting a first intermediate data signal according to a first predetermined binary arithmetic function applied to the first input data signal and the first pseudonoise signal, a second binary arithmetic unit receiving a second input data signal and a second pseudonoise signal and outputting a second intermediate data signal according to a second predetermined binary arithmetic function applied to the second input data signal and the second pseudonoise signal, a third binary arithmetic unit receiving the second input data signal and the first pseudonoise signal and outputting a third intermediate data signal according to a third predetermined binary arithmetic function applied to the second input data signal and the first pseudonoise signal, a fourth binary arithmetic unit receiving the first input data signal and the second pseudonoise signal and outputting a fourth intermediate data signal according to a fourth predetermined binary arithmetic function applied to the first input data signal and the second pseudonoise signal, a second selector receiving the first and second intermediate data streams and a QPSK select signal and outputting a first output data signal, a third selector receiving the third and fourth intermediate data streams and one among the QPSK select signal and its inversion and outputting a second output data signal, an output selector receiving the first and second output data signals, an OOK data signal, and one among the OOK select signal and its inversion and outputting first and second exiting data signals, wherein the first and second output data signals comprise at least the first input data signal spread by the first and second pseudonoise signals by one among at least BPSK and QPSK modulation, depending on the level of the QPSK select signal, and wherein the first and second exiting data signals comprise (A) at least the first initial data signal spread by one among at least BPSK and QPSK modulation, or (B) at least the OOK data signal spread by at least the first and second pseudonoise signals by OOK modulation, depending on the level of the OOK select signal.

15. A spreader architecture as in claim 14, said first selector performing a logical exclusive-OR function.

16. A spreader architecture as in claim 14, said first selector receiving the OOK data signal or its inversion, and said first input data signal being based on at least one among the first initial data signal and the OOK data signal, depending on the level of the OOK select signal.

17. A spreader architecture as in claim 14, wherein at least one among the first through fourth predetermined binary arithmetic functions comprises a logical exclusive-OR function.

18. A spreader architecture as in claim 14, said output selector receiving a gating signal, wherein the levels of the first and second exiting data signals remain constant when the gating signal assumes a predetermined level.

19. A spreader architecture according to claim 14, said output selector comprising:

an OOK modulator receiving (A) one among the OOK data signal and its inversion and (B) one among the OOK select signal and its inversion and outputting an OOK modulation signal, a first output gate receiving (A) one among the first output data signal and its inversion and (B) one among the OOK modulation signal and its inversion and outputting a first exiting data signal; and a second output gate receiving (A) one among the second output data signal and its inversion and (B) and one among the OOK modulation signal and its inversion and outputting a second exiting data signal, wherein the first exiting data signal comprises the first output data signal OOK modulated by one among the OOK modulation signal and its inversion, and wherein the second exiting data signal comprises the second output data signal OOK modulated by one among the OOK modulation signal and its inversion.

20. A spreader architecture, comprising:

a pseudonoise spreading enabling unit receiving first and second pseudonoise signals and a pseudonoise enable signal and outputting first and second pseudonoise spreading signals;

a first binary arithmetic unit receiving a first input data signal and the first pseudonoise spreading signal and outputting a first intermediate data signal according to a first predetermined binary arithmetic function applied to the first input data signal and the first pseudonoise spreading signal, a second binary arithmetic unit receiving a second input data signal and a third pseudonoise signal and outputting a second intermediate data signal according to a second predetermined binary arithmetic function applied to the second input data signal and the third pseudonoise signal, said third pseudonoise signal comprising at least one among the second pseudonoise signal and the second pseudonoise spreading signal, a third binary arithmetic unit receiving the second input data signal and the fourth pseudonoise signal and outputting a third intermediate data signal according to a third predetermined binary arithmetic function applied to the second input data signal and the fourth pseudonoise signal, said fourth pseudonoise signal comprising at least one among the first pseudonoise signal and the first pseudonoise spreading signal, a fourth binary arithmetic unit receiving the first input data signal and the second pseudonoise spreading signal and outputting a fourth intermediate data signal according to a fourth predetermined binary arithmetic function applied to the first input data signal and the second pseudonoise spreading signal, a first selector receiving the first and second intermediate data streams and a QPSK select signal and outputting a first output data signal, a second selector receiving the third and fourth intermediate data streams and one among the QPSK select signal and its inversion and outputting a second output data signal, and an output selector receiving the first and second output data signals, an OOK data signal, and an OOK select signal and outputting first and second exiting data signals, wherein the first and second output data signals comprise at least the first input data signal spread by the first and second pseudonoise spreading signals by one among at least BPSK and QPSK modulation, depending on the level of the QPSK select signal, and wherein the first and second exiting data signals comprise (A) one among at least the first input data signal and the OOK data signal (B) spread by the first and second pseudonoise spreading signals by one among at least BPSK, QPSK, and OOK modulation, depending on the levels of the QPSK and OOK select signals, and wherein the first and second pseudonoise spreading signals remain constant when the pseudonoise enable signal assumes a predetermined level.

* * * * *